Patented Apr. 5, 1932

1,852,444

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS FOR VULCANIZING RUBBER AND PRODUCTS OBTAINED THEREBY

No Drawing.     Application filed November 1, 1926.   Serial No. 145,718.

The present invention relates to the treatment of rubber with various reaction products of aldehyde amine condensation products, and particularly to the preparation of halogen containing aldehyde amines. The invention is also concerned with improving the vulcanization-accelerating power of such condensation products by treatment with halogens or with halogen acids.

As one illustration of a method of preparing one of these halogen-containing condensation products, 50 parts by weight of a condensation product of heptaldehyde and aniline are dissolved in 50 parts of benzol or carbon tetrachloride. Into this solution chlorine gas is run until the evolution of hydrogen chloride commences. Ordinarily the odor of hydrogen chloride will become apparent after about 26 parts by weight of chlorine have been absorbed. Thereupon the solvent and the excess of chlorine are removed, for instance by evaporation or by washing or aeration, and residue is obtained which analyzes to approximately 26.4% of chlorine. Upon treatment with N/10 iodine in benzol, one gram of the halogenated condensation product will absorb all of the iodine contained in 41 ccs. of the iodine solution. If .05 parts of this reaction product be mixed with 100 parts by weight of rubber, 10 of zinc oxide, and 3 of sulphur and vulcanized at 40 lbs. steam pressure for 30 minutes, 60 minutes and 90 minutes, the tensile strength of the vulcanized stock will be found to be approximately 3050, 3230 and 3345 lbs. per sq. in. respectively. Instead of the above proportion of reaction product, excellent results may be obtained by the use of .1 part, .25 parts and .5 parts of reaction product.

On the assumption that the molecular weight of the above described condensation product of heptaldehyde and anilin is 285, it has been found if one molecular weight of the said product be treated with amounts of chlorine up to six atomic weights that one half of the chlorine is evolved as hydrogen chloride and the other half of the chlorine substitutes into the molecule of the product.

Any of these chlorine reaction products containing 1, 2 or 3 atoms of chlorine or mixtures of the same have been found to accelerate well.

If a molecular weight of the aldehyde anilin condensation product be treated with eight atomic weights of chlorine it is found that only three molecular weights of hydrogen chloride are evolved and that three atomic weights of chlorine are substituted into the molecule and that two atomic weights of chlorine are added to the molecule, thus yielding a product containing five atomic weights of chlorine per molecule. It has been our experience that this product does not accelerate vulcanization. If, however, this product be boiled with aqueous alkali, one chlorine atom per mole is lost and the resulting hydrolyzed product containing four atomic weights of chlorine is found to be a powerful accelerator. .1 part in the formula given above gave a tensile of 2500 in 60' under 40 pounds steam pressure.

The bromine and iodine reaction products of heptaldehyde aniline may be made in a similar way. 1 gram of the bromine reaction product will absorb approximately 36.7 ccs. of N/10 iodine, while the iodine reaction product will absorb the iodine in about 3 ccs. With 0.1 part of the iodine reaction product in the above rubber stock a tensile strength of 3265 lbs. may be obtained in 60 minutes at 40 lbs. steam pressure.

A hydrogen chloride derivative of heptaldehyde aniline may be prepared by dissolving 20 parts by weight of the heptaldehyde aniline in twice its volume of dry ether, and then treating with dry hydrogen chloride gas for about 4 hrs., keeping the reaction mixture cooled with ice. After the mixture has become saturated, the ether may be removed by vacuum distillation, and the excess of hydrochloric acid may be eliminated by passing air through the reaction mixture. The reaction product is a viscous mass having an agreeable smell. One gram of it will absorb all the iodine in 58.2 c. c. of N/10 iodine in benzol. A rubber compound containing 100 parts by weight of rubber, 10 of zinc oxide, 3 of sulphur and .1 part of this hydrogen chloride reaction product will give a tensile strength of 2875 lbs. per sq. in. in 60 minutes vulcanization at 40 lbs. steam pressure. This reaction product may also be prepared by introducing dry hydrogen chloride into the heptaldehyde aniline condensation product directly. One gram of the reaction product prepared in this manner will absorb the iodine in approximately 56.2 ccs. of N/10 iodine.

While heptaldehyde aniline has been used as the illustration of an aldehyde amine condensation product, it is to be understood that other aldehyde-aniline condensation products, the aldehyde portion of which has from 2-7 carbon atoms in the open chain, may be employed. It will be observed that the formation of these halogen containing reaction products or derivatives will result in an increase in the accelerating value of the aldehyde amine. The invention is not limited to any particular proportion of aldehyde to amine in the condensation products, but contemplates the use of such condensation products in which the amount of aldehyde or amine may be varied within the known limits. The invention also aims to include the halogen containing reaction products or derivatives of aldehyde amines in which the aldehyde portion may comprise more than one aldehyde. The condensation products which are utilized herein may be prepared in any desired manner, and as stated above the constituents may be in any suitable proportions, the combination of aldehyde and amine being effected in one reaction or in several reactions in any well-known manner.

The accelerating products of the present invention may be added to rubber on the mixing mill in the usual manner, or may be introduced into solid rubber in any other suitable way, or into rubber solutions or dispersions including aqueous dispersions of rubber, either artificial or natural.

Having thus described my invention, what I claim and desire to protect by Letters Patent is:

1. Process for treating rubber which comprises combining therewith sulphur and a halogen containing derivative of a preformed condensation product of heptaldehyde and aniline capable of accelerating vulcanization and containing not more than substantially four atomic weights of the halogen, and vulcanizing the rubber.

2. Process for treating rubber which comprises combining therewith a vulcanizing agent and a halogen containing derivative of a preformed condensation product of heptaldehyde and aniline capable of accelerating vulcanization and containing not more than substantially four atomic weights of the halogen, and vulcanizing the rubber.

3. Process for treating rubber which comprises combining therewith sulphur and a chlorine containing derivative of a preformed heptaldehyde aniline condensation product capable of accelerating vulcanization and containing not more than substantially four atomic weights of chlorine, and vulcanizing the rubber.

4. Process for treating rubber which comprises combining therewith sulphur and an alkali-hydrolyzed product of a chlorine-containing derivatives of a preformed heptaldehyde aniline condensation product capable of accelerating vulcanization and containing not more than substantially four atomic weights of chlorine, and vulcanizing the rubber.

5. Vulcanized rubber derived from rubber combined with a vulcanizing agent and a halogen containing derivative of a preformed condensation product of heptaldehyde and aniline capable of accelerating vulcanization and containing not more than substantially four atomic weights of the halogen.

6. Vulcanized rubber derived from rubber combined with a vulcanizing agent and halogen containing derivatives of preformed condensation products of heptaldehyde and aniline capable of accelerating vulcanization and containing not more than substantially four atomic weights of the halogen.

7. Vulcanized rubber derived from rubber combined with sulphur and a chlorine containing derivative of preformed heptaldehyde aniline condensation products capable of accelerating vulcanization and containing not more than substantially four atomic weights of chlorine.

8. Vulcanized rubber derived from rubber combined with sulphur and an alkali-hydrolyzed product obtained from a chlorine-containing derivative of a preformed heptaldehyde aniline condensation product capable of accelerating vulcanization and containing not more than substantially four atomic weights of chlorine.

Signed at New York, New York, this 14th day of October, 1926.

SIDNEY M. CADWELL.